3,454,513
METAL POWDERS COATED WITH SILICA AND A WATER SOLUBLE ACETATE
Martin V. Azarian, 10 E. 85th St.,
New York, N.Y. 10028
No Drawing. Filed July 30, 1965, Ser. No. 476,145
Int. Cl. C08g *45/04;* C09c *1/66*
U.S. Cl. 260—23                     25 Claims

ABSTRACT OF THE DISCLOSURE

The disclosure sets forth the preparation of non-tarnishing bronze or similar metal powders by treating them in an aqueous solution of a water soluble silicate which may contain a sodium salt of a weak acid such as sodium acetate and a wetting agent. The final product, with or without the addition of organic solvents after settling, is dried.

This invention relates to the art of stabilized metallic powders and methods of making the same.

Although not limited thereto, the present invention will be particularly described in its application to bronze powders, composed of alloys of copper and zinc (also known as brass) with occasional additions of small amounts of aluminum, or of pure copper or pure aluminum. These powders are usually employed as metallic pigments of various shades of gold, copper and silver.

Tarnishing of these powders has always presented a serious problem and they were unavailable as pigments for an outdoor paint, and as a printing pigment where the printed matter receives much handling, and subsequent tarnishing from contact with perspiration and in the presence of tarnishing chemicals.

It was found that such powders could only be used under non-tarnishing conditions. Furthermore, when such pigments were used in molded, extruded of calendered plastics, the high temperature processing of such plastics as, for example, polyethylenes, polystyrenes, polycarbonates caused tarnishing and greening of the bronze powders and undesirable changes in color. Some resins such as vinyl and vinylidene polymers and co-polymers even at low temperatures reacted with bronze powders to cause tarnishing.

It is among the primary objects of the present invention to provide a novel protected bronze powder which is tarnish-resistant in hostile and tarnishing environments, and in addition heat-resistant at temperatures of 500° F. and higher in hot processing with modern plastics.

Another object is to make protected bronze powders which are tranish-resistant when used where tarnishing is a problem.

Another object is to make metallic pigments available and tarnish-resistant when used as pigments for an outdoor paint, and as a printing pigment where the printed matter receives much handling and subsequent tarnishing from contact with perspiration, and in the presence of tarnishing chemicals in the air or with the substrate to which it is applied.

A still further object is to make metallic pigments available and tarnish-resistant without need for over-coating the finished product with a protective coating.

Another object is to avoid difficulties when bronze powders are incorporated in plastics subject to high temperature processing after the pigment has been incorporated, with assurance that there will be no change of color.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, according to one preferred embodiment, bronze powder is heated in a solution of a water soluble silicate containing a water soluble salt such as the sodium or potassium salt of an inorganic or organic acid.

Although other silicates have been found successful, the preferred sodium silicate solution consists of a ratio of 1% $Na_2O$:2.40% $SiO_2$, whereas the salts of weak acids are preferred, such as acetic, formic, propionic, oxalic, malic and the like. The preferred composition is a solution of both alkali metal silicate and alkali metal acetate which produce a combination coating or deposit including both silica and acetate. It is also desirable to include the water soluble lithium salt and the wetting agent.

To facilitate and improve the wetting of powder, a small amount of a wetting agent may be used, such as a commercial grade of alkyl aryl polyether alcohol.

After proper mixing and under heat, certain powders usually require the addition of a small amount of a water soluble lithium salt of a weak acid as set forth above or of an inorganic acid, such as lithium sulfate. This mixture is subjected to drying, screening and, in some cases, to a polishing treatment as used by commercial bronze power manufacturers.

Another small addition consisting of stearic acid, an epoxy, or suitable chemical dictated by the final end use, is made in the polisher.

The preferred treating solution is composed of 10 to 90 parts by weight of water, 2 to 25 parts of sodium or potassium acetate, 0.5 to 2.0 of a wetting agent such as alkyl aryl polyether alcohol, 0.1–50.0 parts of soluble silicate, to which are added 1 to 75 parts of a bronze powder. The mixture is cooked for better performance up to 165° F. for 5 to 60 minutes and then, for certain bronze powders, a water soluble lithium salt such as lithium sulfate is added near the end of the mixing procedure.

The final product is cooled, dried and screened. A low molecular weight water soluble organic aliphatic solvent, such as ethyl acetate, acetone, methyl ethyl ketone, propyl alcohol, may be added in any amounts of 10 to 40 parts during or before settling. The final settled product is dried and screened.

Desirably, the soluble silicate is mixed with dilute sodium or potassium acetate before mixture with the bronze powder which may be sized from 1,000 to 100 mesh or even up to 20 mesh. However, large metal particles, granules, pieces or parts subject to surface corrosion or tarnishing may be similarly treated.

To give some specific examples:

EXAMPLE I

A metallic bronze powder having a fineness of subdivision of between 100 to 200 mesh, made of copper and zinc, is stirred into a treating bath consisting of:

| Ingredient | Range | Preferred |
|---|---|---|
| Water | 10–90 | 53.0 |
| Sodium Acetate | 2–25 | 10.0 |
| Soluble Silicate | 0.1–50 | 2.0 |
| Bronze Powder | 1–75 | 35.0 |

The ingredients are added in the order listed. The bronze powder is added at a higher temperature, preferably at 190° F. After heating for 15–30 minutes, the mixture is cooled down to approximately 110° F. The excess water is drawn off and the slurry is dried.

The preferred sodium silicate solution used contains ratios of percent $Na_2O$ to percent $SiO_2$ ranging from 1:1.60 to 1:3.75 respectively.

Potassium silicate solutions containing ratios of percent $K_2O$ to percent $SiO_2$ of 1:2.1 to 1:2.5 may also be used.

Metallic particles made of metals such as bronze, copper, zinc and aluminum when treated using the process of this invention develop better heat resistance, chemical resistance and light fastness enabling the use of these metallic powders in areas and end uses where tarnishing and oxidation as well as poor resistance to heat and poor light fastness was likely. For example, when ordinary bronze powders are incorporated into vinyl chloride, vinyl acetate and vinylidene chloride and other plastics which might cause tarnish or surface corrosion due to reactions, with such resins, the heat in the process as well as any free active monomers or active chemicals, which are formed or emitted may result in a darkening or a change in color of the metallic powder and subsequent loss of brilliance. Even without this degradation, the lightfastness is rather poor. When coated, using the formulation of the present invention, these reaction difficulties are greatly diminished or eliminated.

The process of the present invention results in having a metal coated with silica or sometimes commonly referred to as glass. The presence of the acetate is believed to help by virtue of its good film forming characteristics and provide better covering of the metal involved. The presence of the acetates also is believed to prime the surface of the metal and provides a bond by partial reaction with the silicate. It is not precisely known whether the bond is physical or chemical. The coating of the metal seems to occur at the point of cooling after the addition of all the ingredients into the formulation when the silicates begin to precipitate out of solution and begin deposition on the metal. The presence of the acetates in the formulation also helps to impart water resistance to the final coated metal.

To give some further examples:

EXAMPLE II

The formulation as given in Example I is diluted 70 parts of the formulation to 30 parts of a faster evaporating solvent than water, such as acetone. The excess water plus solvent in this mixture is drawn off and the slurry is dried.

This greatly facilitates the drying and improves the brilliance of the metallic powder.

EXAMPLE III

The following procedure was used for the more difficult powders. It was found that as the copper content increased beyond a certain point, a different and more elaborate treatment is required than outlined in Example I and Example II. The procedure for this is as follows:

| Ingredient | Range | Preferred, parts |
|---|---|---|
| Water | 10–90 | 40.0 |
| Sodium Acetate | 2–25 | 8.0 |
| Alkyl Aryl Polyether Alcohol | 0.5–2.0 | 0.1 |

Bring temperature to 140° F. while mixing. Then add 5.4 parts soluble sodium silicate and 5.4 parts water, these two ingredients having been premixed. The range of these ingredients may be 0.1 to 50 parts each. Bring temperature up to 150° F. while mixing. Then add 27.0 parts metallic powder (range 1–75 parts). Continue mixing until the powder is thoroughly wetted and then add 12.0 parts water (range 1–50 parts) and 2.1 parts lithium sulfate (range 0.1–25 parts). Continue heating and mixing to 165° F. then subject to cooling down to room temperature. Excess water is taken out by vacuum or a roll squeegee method, then it is subjected to further drying with heat, down to at least 0.3% of moisture content. After drying it is sometimes subjected to a polishing treatment consisting of an additive (usually under 1%) of a stearic acid, epoxy or suitable agent depending on final end use.

Example III produces an excellent treated powder even with the lower-copper-containing powders at the expense of a slight sacrifice in brilliance.

EXAMPLE IV

To the formulation as given in Examples I and II, a small amount of wetting agent is added. The preferred amount is 0.1% on the basis of the entire formulation but it is by no means restricted to this amount and a range of 0.001% to 3% may be used on the basis of the entire formulation. This addition produces more uniform and consistent coatings on the metallic powders.

EXAMPLE V

The same formulation as in Example III is used with the following modifications:

(1) No heat is used in this example.
(2) Because of the lack of heat, the wetting of the metallic powder becomes more difficult and the use of more liberal amounts of wetting agent is required. Amounts of up to 0.5% of alkyl aryl polyether alcohol, and, with very fine metallic powders, even greater amounts may be required.
(3) Heat is essential only in the drying process. A temperature range of 212° F.–450° F. is indicated. An optimum temperature would be 300° F.–350° F.
(4) When this heatless process is used (except where heat is required in the drying process), it has been found that high-copper-containing metallics, especially those of smaller particle size, do not attain the high heat and chemical-resistant properties of those as in Example III.

The metal powders produced according to the present invention were exposed to a fadeometer and showed no color change after 300 or more hours whereas the untreated product showed a drastic change after 20 to 30 hours.

Furthermore, upon exposure to chlorine or sodium chlorite or other bleaching solutions and dilute caustic soda no drastic change occurs. Also, when exposed to concentrated hydrochloric acid and hydrogen sulfide gas and dilute NaOH solutions, the composition is very stable.

The same procedure could be used for finely divided copper and zinc alloys and even with aluminum and it is particularly useful when these materials after coating, according to the invention, are used in connection with resinous, varnish or lacquer coatings or stearate coatings or with combination stearate and epoxy coatings.

The same coating procedure may also be used upon outdoor metal furniture of aluminum, brass, bronze, and copper, metal roofing, metal boats, vehicle and automotive trims and the like.

The acetate may be omitted but it appears to give a priming effect and assures a better bond to the metal surface by the silica.

The use of a wetting agent results in a more uniform coating around the individual particles and therefore a more uniform and consistent product. At the expense of uniformity it may, however, be eliminated.

The coating seems to take place at the point of cooling after the solution has been cooked or heated to an elevated temperature.

As the copper content in the bronze powder increases up to and including 100% pure copper, the use of a lithium salt such as lithium sulfate is required as in Example III. It is believed that a reaction occurs between the copper and lithium salt. It is not known whether this reaction is chemical or physical.

The acetates give high water resistance.

After this coating process, it is also possible to apply further coatings with various types of fatty acids or tallow as, for example, stearic acid, palmitic acid and oleic acid which would appear to form a superimposed coating.

Also, further coatings may be applied with any other agents known to those skilled in the art, giving the metal coatings more luster, even further chemical resistance and other desirable properties.

The present procedure also appears to improve the surface of the coating for the acceptance of additional coatings such as those above described.

The process may be applied to metal powders, granules, flakes and even to large metal parts.

As many changes could be made in the above method and article, and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. A method of rendering metallic bronze powder non-tarnishing which comprises heating 1 to 75 parts of a bronze powder in an aqueous bath containing 10 to 90 parts by weight of water; 2 to 25 parts by weight of an alkali metal acetate; 0.5 to 2.0 parts of alkyl aryl polyether alcohol wetting agent, and 0.1 to 50.0 parts of water soluble silicate, said heating being to a temperature between 140° F. to 212° F. and for at least 5 minutes and the bath then being cooled followed by drawing off the excess water and drying the removed solids to a powder.

2. The method of claim 1 in which the bath is diluted with a water miscible solvent in the amount of 10 to 40 parts by weight that is faster evaporating than water, such dilution being after cooling and before drawing off the excess water and thereupon the powder is then recovered and dried.

3. The method of claim 1 to which bath .001% to 3% of a non-ionic emulsifying agent is added.

4. The method of claim 1 in which the aqueous bath is heated first to 190° F.

5. The method of claim 1 in which said bath is heated at 150 to 212° F. for 5 to 60 minutes 6. The method of claim 1 to which the wetting agent is added in the amount of 0.1% of the bath.

7. The method of rendering metallic bronze powder non-tarnishing using a water soluble silicate selected from the group consisting of a sodium silicate containing ratios of percent $Na_2O$ to percent $SiO_2$ ranging from 1:1.60 to 1:3.75 respectively and potassium silicate containing ratios of percent $K_2O$ to percent $SiO_2$ of 1:2.1 to 1:2.5 respectively and also including 2 to 25 parts by weight of a water soluble acetate, all in an aqueous bath, said aqueous bath being heated to between 140° F. to 212° F. and said bath containing from 1 to 75 parts by weight of bronze powder, 10 to 90 parts by weight of water and 0.1 to 50 parts by weight of silicate.

8. A method of rendering metallic bronze powder non-tarnishing which comprises heating the bronze powder at a temperature between 140° F. and 212° F. in an aqueous bath containing 10 to 140 parts by weight of water, 2 to 25 parts of sodium acetate, alkyl aryl polyether alcohol in an amount up to 2.0%, 0.2 to 100 parts of a 50–50 mixture of sodium silicate and water, 1 to 75 parts of bronze powder, and 0.1 to 25 parts of a water-soluble lithium salt.

9. The method of claim 8 in which the bath is heated between 140° F. to 212° F., cooled to room temperature, the water is removed and the powder is dried so that its water content is less than 0.3%.

10. The method of claim 8 in which an alkyl aryl polyether alcohol is added in an amount up to 0.5%.

11. The method of claim 10 in which the powder is dried in a temperature range of 212° F. to 450° F.

12. A method of rendering metallic bronze powder non-tarnishing which comprises heating the bronze powder in an aqueous bath at temperature between 140° F. and 212° F. containing 400 parts of water, 8.0 parts of sodium acetate, 0.1 part alkyl aryl polyether alcohol and 10.8 parts of a 50–50 mixture of sodium silicate and water 27.0 parts of bronze powder and 2.1 parts of lithium salt of an inorganic acid, followed by cooling, recovering the powder from the bath and drying.

13. A method of rendering metallic bronze powder non-tarnishing which comprises heating the bronze powder in an aqueous bath containing 53.0 parts by weight of water, 10.0 parts by weight of sodium acetate, 2.0 parts by weight of water soluble silicate and 35.0 parts by weight of bronze powder, said heating being up to about 165° F. and for from 5 to 60 minutes followed by cooling, removing the water and drying the solids.

14. A method of rendering bronze powder non-tarnishing which comprises heating the bronze powder in an aqueous bath between 140° F. and 212° F. containing 10 to 90 parts by weight of water; 2 to 25 parts by weight of sodium acetate; 2 to 45 parts by weight of a water soluble silicate and 5 to 50 parts by weight of bronze powder.

15. The method of claim 14 which comprises using a wetting agent in the bath in an amount up to 0.5%, said wetting agent being a non-ionic emulsifying agent.

16. The method of claim 14 in which the bath is heated to 190° F. for from 5 to 60 minutes, then cooled to 150° F. and the powder is recovered and dried at a temperature not higher than 250° F.

17. The method of producing non-tarnishing copper and copper alloy powders which comprises treating said powders at room temperature in an aqueous bath containing 10 to 90 parts by weight of water, 2 to 25 parts by weight of a water soluble acetate and 2 to 45 parts by weight of water soluble silicate, 5 to 50 parts of the powder and up to 0.5 parts of a wetting agent, said wetting agent being a non-ionic emulsifying agent.

18. The method of claim 17, said wetting agent being alkyl aryl polyether alcohol.

19. The method of claim 17, said water being removed after treatment and after the powder has settled and then heating the powder at 212° F. to 450° F. to dry the powder to a water content of less than 0.3%.

20. The process of rendering metal powders selected from the group of bronze, brass, copper and aluminum non-tarnishing which comprises coating them with a deposit from a water bath containing a water soluble silicate and a water soluble acetate, said water bath containing 1 to 75 parts of the metal powder, 10 to 90 parts by weight of water, 2 to 25 parts by weight of the acetate and 0.1 to 50 parts by weight of silicate.

21. In a polyvinyl plastic material the non-tarnishing dried bronze powder of claim 1 serving as the pigment therein.

22. In a polyvinyl chloride material, the non-tarnishing dried bronze powder of claim 1 serving as the pigment therein.

23. The metal powder of claim 20 coated with a deposit from a water soluble silicate and a water soluble acetate.

24. A non-tarnishing, acid resistant bronze powder mixed without change in color value with resin polymers selected from the group consisting of polyethylene, polystyrene, polycarbonate and other vinyl and vinylidene polymers and copolymers, said powder having a base coating of silica and a superimposed coating of a high molecular weight fatty acid.

25. In a thermoplastic resin polymer, a non-tarnishing bronze powder of 100 to 250 mesh having a thin coating of silica combined with an alkali metal acetate.

References Cited

UNITED STATES PATENTS

| | | | |
|---|---|---|---|
| 2,290,914 | 7/1942 | Machlin | 106—308 |
| 2,303,504 | 12/1942 | Ryan | 117—100 |
| 2,528,034 | 10/1950 | Clayton | 106—290 |
| 2,864,719 | 12/1958 | Willis | 106—290 |
| 2,885,366 | 5/1959 | Iler | 252—313 |
| 2,934,512 | 4/1960 | Godshalk | 260—41 |
| 3,041,303 | 6/1962 | Nelson | 260—41.5 |

DONALD E. CZAJA, *Primary Examiner.*

R. A. WHITE, *Assistant Examiner.*

U.S. Cl. X.R.

106—290, 308; 117—100; 260—37, 41